(12) United States Patent
Johannesson

(10) Patent No.: US 6,223,462 B1
(45) Date of Patent: May 1, 2001

(54) DEVICE FOR SORTING OUT MARINE SPECIES IN FISHING TRAWL

(75) Inventor: Johannes Johannesson, Saudarkrok (IS)

(73) Assignee: EX-IT EHF., Saudarkrok (IS)

( * ) Notice: Subject to any disclaimer, the term of this patent is extended or adjusted under 35 U.S.C. 154(b) by 0 days.

(21) Appl. No.: 09/319,567
(22) PCT Filed: Dec. 8, 1997
(86) PCT No.: PCT/IS97/00006
§ 371 Date: Jun. 9, 1999
§ 102(e) Date: Jun. 9, 1999
(87) PCT Pub. No.: WO98/25452
PCT Pub. Date: Jun. 18, 1998

(30) Foreign Application Priority Data

Dec. 9, 1996 (IS) ............................................. 4395

(51) Int. Cl.⁷ .................................................. A01K 73/02
(52) U.S. Cl. .......................................................... 43/9.2
(58) Field of Search ................... 43/7, 9.1, 9.2, 43/9.3

(56) References Cited

U.S. PATENT DOCUMENTS

| | | | |
|---|---|---|---|
| 3,900,982 | * | 8/1975 | Gale ............................................. 43/7 |
| 4,043,068 | * | 8/1977 | Savoie ...................................... 43/9.3 |
| 4,402,154 | * | 9/1983 | Pence ....................................... 43/9.2 |
| 4,739,574 | * | 4/1988 | Saunders ................................. 43/9.2 |
| 4,805,335 | * | 2/1989 | West et al. ............................... 43/9.2 |
| 4,869,010 | | 9/1989 | Saunders, Sr. .......................... 43/9.2 |
| 5,076,000 | | 12/1991 | Anthony ................................... 43/9.2 |
| 5,123,195 | * | 6/1992 | Hawkins .................................. 43/9.2 |
| 5,222,318 | | 6/1993 | Stokes, Jr. et al. ..................... 43/9.2 |
| 5,291,682 | | 3/1994 | Zaccheo .................................. 43/9.2 |
| 5,325,619 | * | 7/1994 | Paul ........................................ 43/9.2 |
| 5,575,102 | * | 11/1996 | Coulon ................................... 43/9.2 |

FOREIGN PATENT DOCUMENTS

| | | | |
|---|---|---|---|
| 2805812 | | 8/1979 | (DE) . |
| 81610 | | 8/1994 | (DE) . |
| 170355 | | 8/1995 | (DE) . |
| 5211 | * | 11/1882 | (GB) ...................................... 43/9.2 |
| 4044 | * | 3/1895 | (GB) ...................................... 43/9.2 |
| 8803 | * | 10/1914 | (GB) ...................................... 43/9.2 |
| 405405 | * | 2/1934 | (GB) ...................................... 43/9.2 |
| 1605 | | 6/1996 | (IS) . |
| WO 92/17999 | * | 10/1992 | (WO) . |
| WO 95/06405 | * | 3/1995 | (WO) . |
| WO 98/36638 | * | 8/1998 | (WO) . |

* cited by examiner

Primary Examiner—Darren W. Ark
(74) Attorney, Agent, or Firm—Wenderoth, Lind & Ponack, L.L.P.

(57) ABSTRACT

The invention concern device placed in a fishing trawl for sorting out marine species not to be caught. The device is inserted in the after part of the trawl, near the trawl bag. The device is a venturi-type narrowing (2) comprising outslip unit (11) being placed in front end of the narrowing, forming a part of the trawl. The outslip unit allows selection of marine species not to be caught. The fish to escape is directed towards the outslip unit (11).

11 Claims, 9 Drawing Sheets

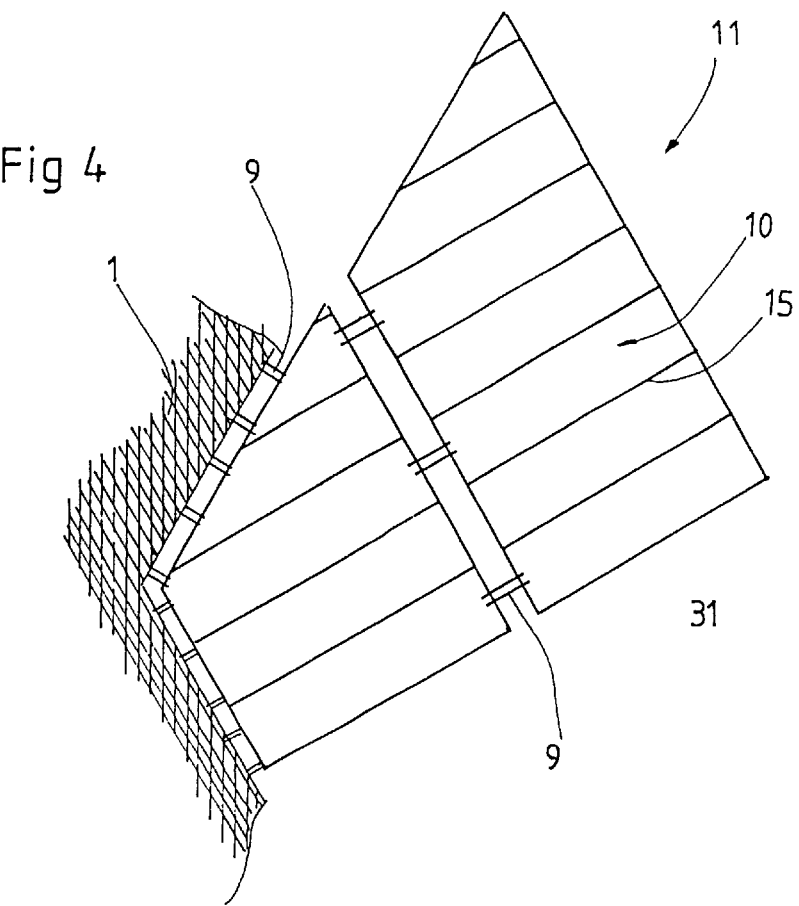
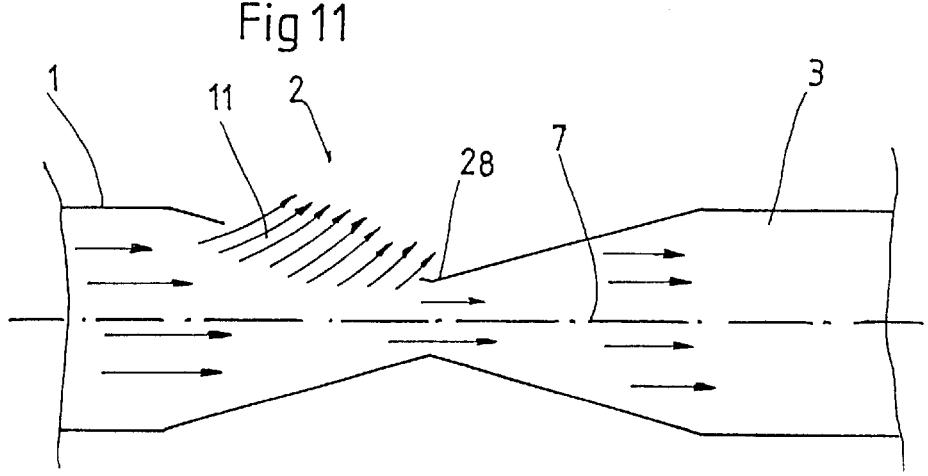

Fig 9
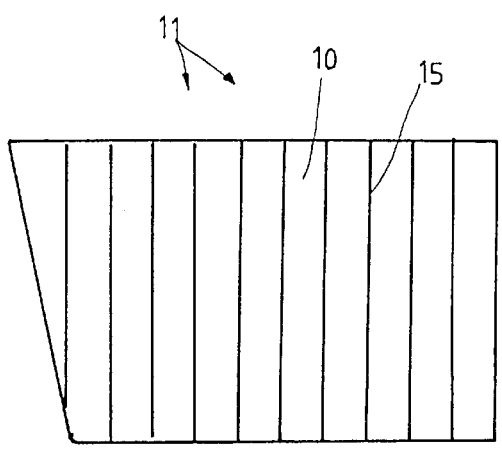
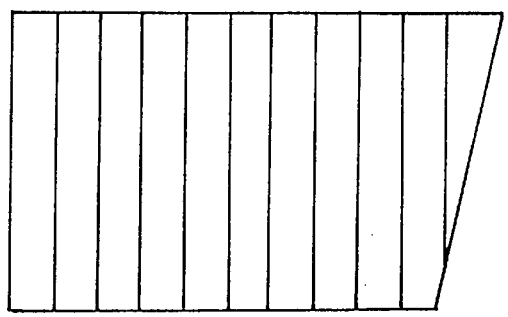
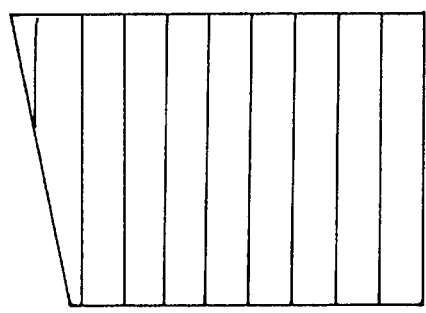
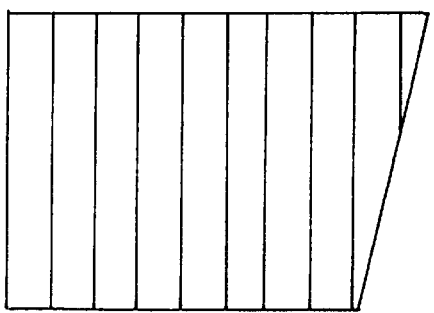
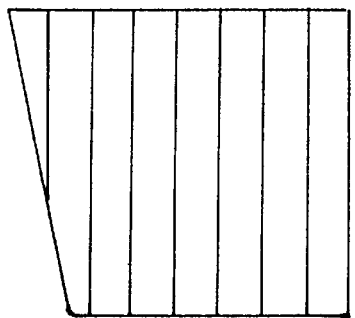
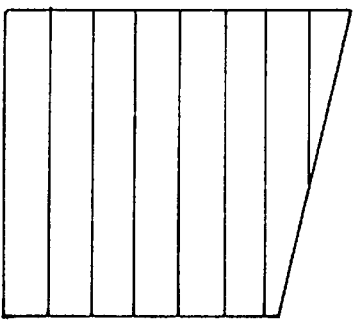
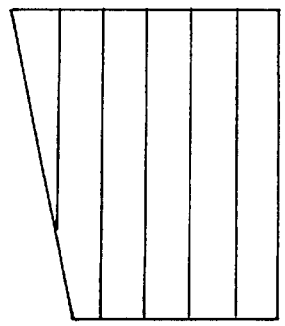
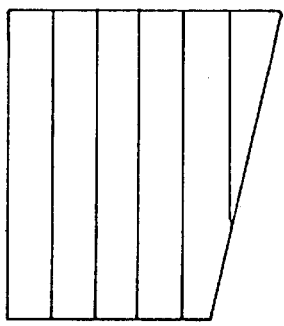

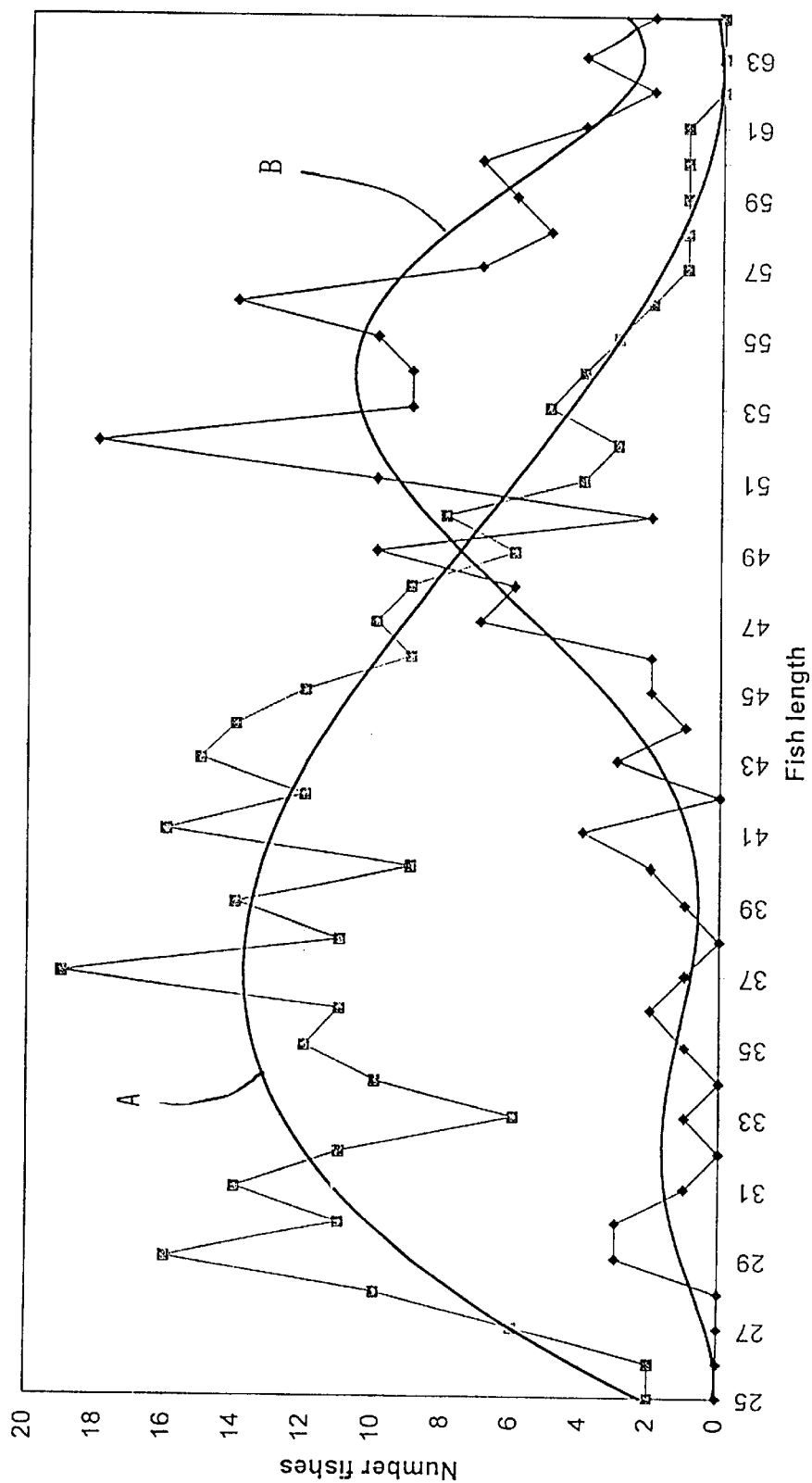

DEVICE FOR SORTING OUT MARINE SPECIES IN FISHING TRAWL

TECHNICAL FIELD

The invention concerns a device placed in a fishing trawl for sorting out marine species not to be caught. The device is inserted in the after part of the trawl near the trawl bag.

BACKGROUND OF THE INVENTION

Conventional fishing trawl can be compared to a big funnel made from net-meshes of different sizes. It has a big opening at one end and narrows down into the trawl bag at the other end where the fish is collected. The trawl is towed after the fishing vessel. Big trawl doors connected by warps to the vessel, floats and bobbins fastened to the fishing line and the foot rope keeps the trawl open. Marine species in the track of the trawl opening that can not swim faster than the trawl is towed by the vessel are caught in the trawl and finally land in the trawl bag.

One of the pre-requisition for sustainable fishing is that governments grant individual quotas, most often to fishing vessels, based on total allowable catches of individual species in their territorial waters. The granted quota, specifies marine species and quantities allocated to the vessel. A vessel is not permitted to land species not included in its quota, unless it is a non quota species. The same is valid for fishes below certain size or weight. The regulations for allocations of quoata can vary from one country to another between fishing grounds and seasons.

Conventional fishing trawl is not designed to differentiate between fish species and it can be difficult to guaranty that fish below certain size does not land in the trawl bag. Mesh sizes in the aft-part of the trawl can deform considerably when fish is collected in the bag and it can then be difficult for small and juvenile fishes to escape through the net meshes. All this results in that small and non quota species are thrown back into the sea. Fish that lands in trawl bag is most often damaged in their scale beyond healing.

In recent years increased interest has been on developing fishing gear that could sort out marine- species that are not to be caught. Such fishing gear would support sustainable development of the marine resources of the sea.

Different equipment's are known for sorting out fish sizes and species not to be caught when trawl fishing. As an example one can mention U.S. Pat. No. 4,739,574, from 1988 that concerns a turtle exclusion device inserted in the trawl body of a shrimp trawl in front of the trawl bag.

Danish Patent No. 170.355, relates to method and equipment to hold fully open meshes in the aft-body of a trawl.

Icelandic Patent No. 1605, laid forward Jun. 20, 1996, describes a device inserted in a trawl in front of the trawl bag. The device consists of two outslip unit units and one stop unit. The grid frames each being with pre-determined number of rods. The outslip unit units are inserted in such a way that they form part of the outer net surface of the trawl and the first grid forms ca. 23° inclination in the direction to the trawl bag where as the other grid is parallel or almost parallel to the trawl axis. The stop unit extend from the end of the second grid to the upper part of the trawl. Fish caught in the trawl moves aft into the trawl and lands on the first grid unit and fish that has smaller diameter than the distance between the rods can escape. It is however a disadvantage of this device that only part of the fish lands on the grid units due to the relativity low water velocity induced by the placement of the grid units.

GENERAL DISCLOSURE OF THE INVENTION

The object of the invention is to present a device that permits a simple and effective selection of the marine species not to be caught.

The device is a narrowing of the after part of the trawl comprising a outslip unit designed in such a way that round fish with less that a certain maximum diameter can escape without being damaged. This is induced by the high velocity/pressure of the water near the outslip units.

DETAILED DISCLOSURE OF THE INVENTION

The object of the invention is achieved in the way that the invention is characterised in that the device being a venturi-type narrowing, comprising an outslip unit being placed in the front half of the narrowing, forming a part of the surface of the trawl.

The invention is further characterised in the device being formed by removing net sections from the device and thereby forming the venturi-type narrowing.

The invention is also characterised in the cross section of the trawl in the venturi-type narrowing is decreased by 30–70%, more preferably 40–50%.

The invention is more further characterised in the outslip unit being placed in the upper or lower half of the of the venturi-type narrowing.

The invention is also characterised in the net mesh size in the venturi-type narrowing being smaller than in the trawl section in front of it.

Further the device is characterised in the area of openings is larger in the outslip unit than in other parts of the venturi-type narrowing.

At last the device is characterised in the outslip unit consisting of a number of grid frames fastened to each other and to the venturi-type mesh narrowing by moveable hinges.

DETAILED DESCRIPTION OF THE DRAWINGS

FIG. 4 shows arrangement of the selecting grids,

FIG. 9 shows a possible design of the outslip unit,

FIG. 10 shows the diagram for the outslip of fish through the device.

FIG. 11 shows the flow of water through the device.

FIG. 1 shows conventional fishing trawl (1) Its front end (21) is kept open by two trawl doors (20) that are connected to the ship and the trawl by wraps (22). At the end of the trawl there is a trawl bag (3) and there in-front the selecting device (2) is inserted.

Figure 1:
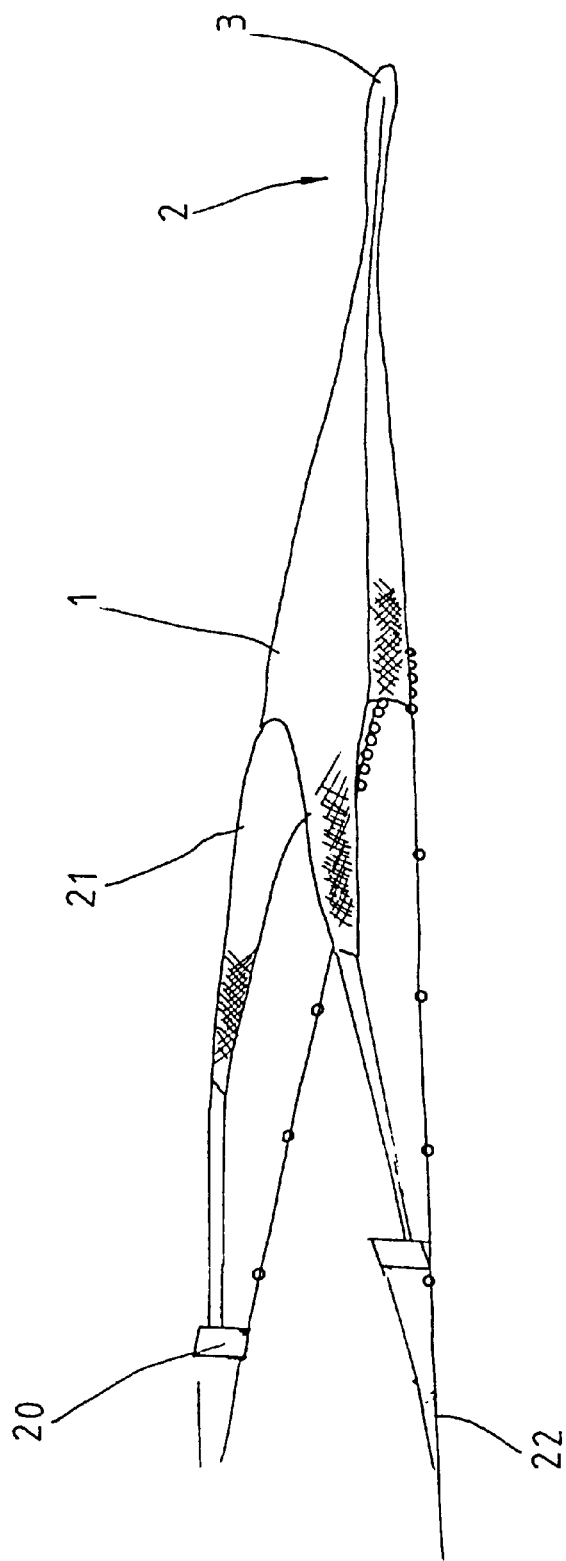
FIG. 1 shows a 3-dimentional view of a fishing trawl.
Figure 2:
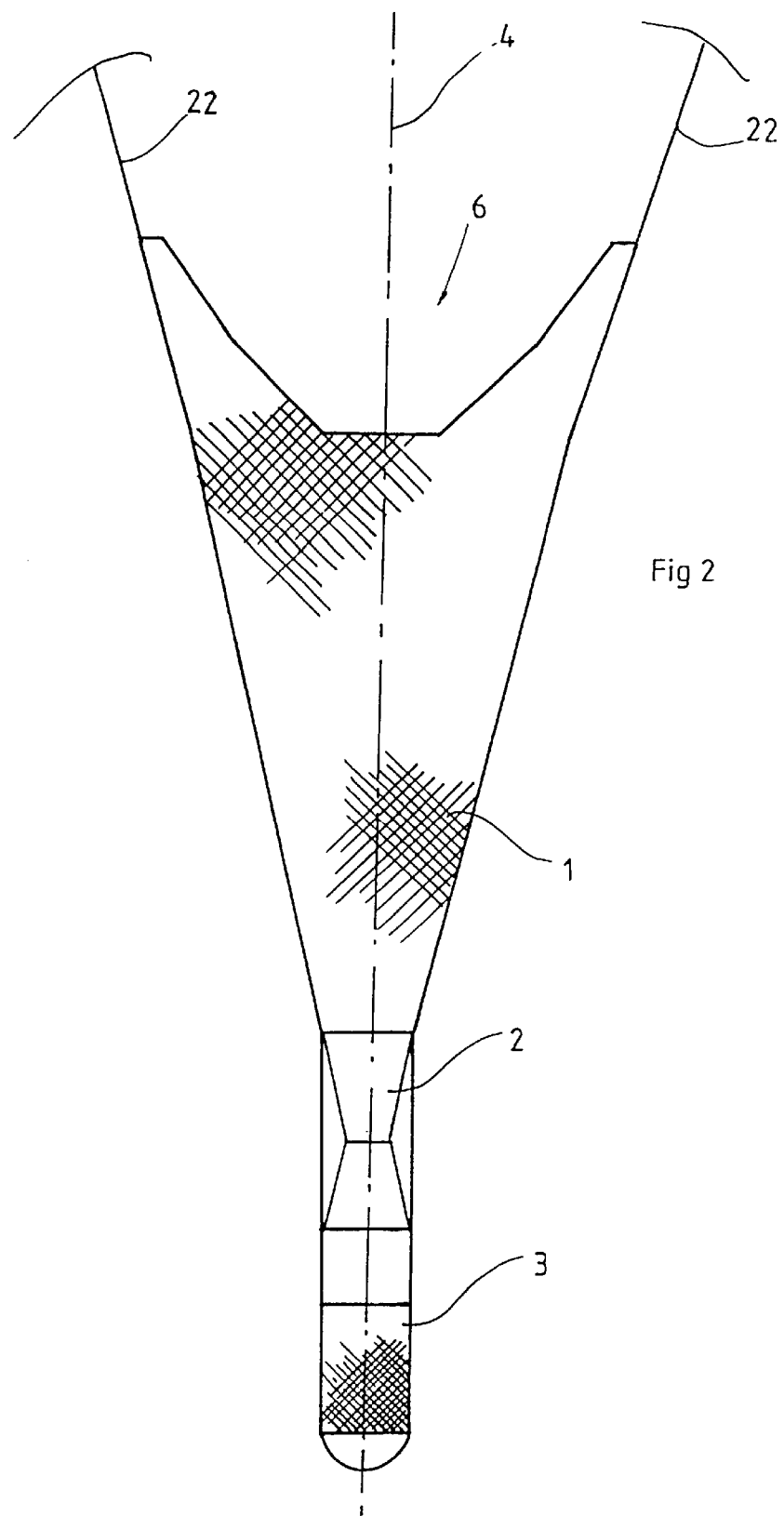
FIG. 2 shows the trawl with the device seen from above.
Figure 3:
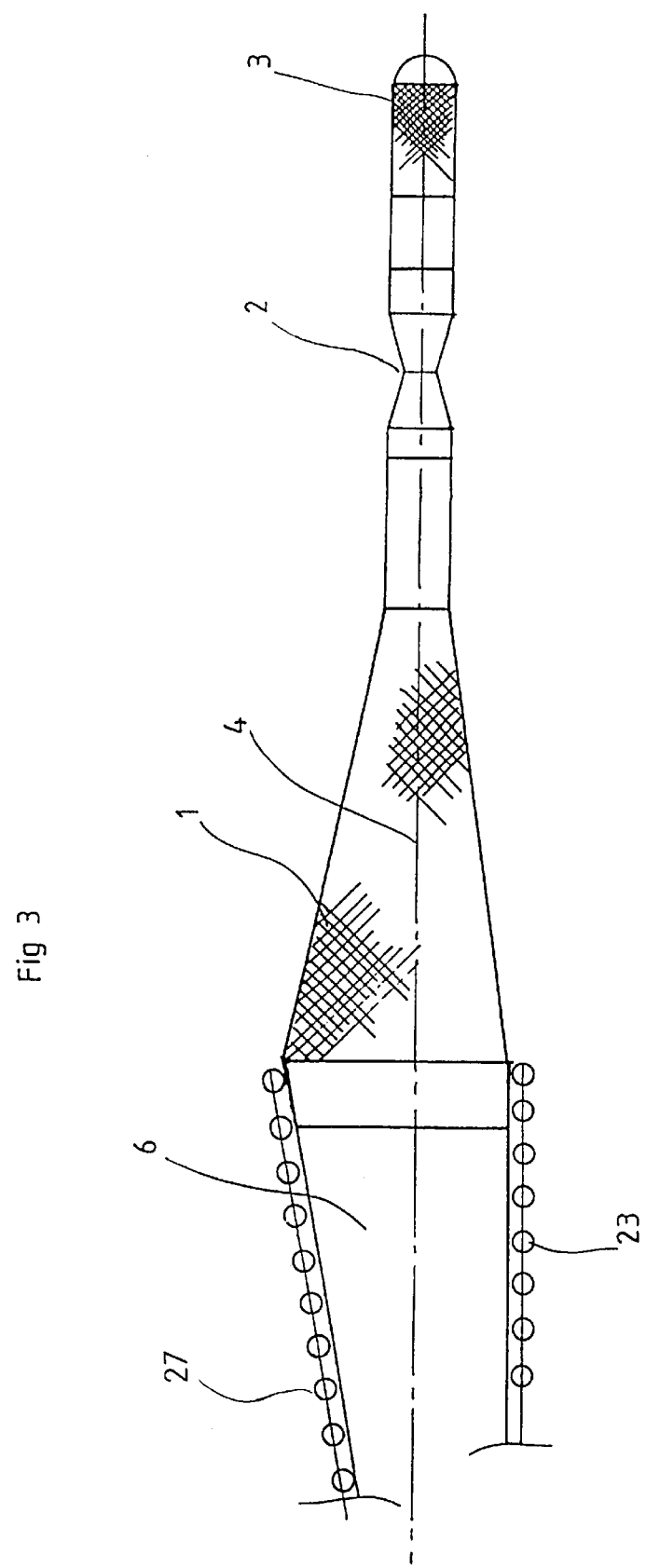
FIG. 3 shows the trawl with the device seen from the side.

FIGS. 2 and 3 show the trawl seen from the side and above. The trawl has a very big opening (6) that is supposed to catch fish and other marine species. Large bobbins (23) at the bottom as well as floating balls (27) helps keeping the trawl open. The trawl narrows aft to a tube section that ends in the trawl bag (3) where the catch is collected. The selecting device (2) is inserted into the net cylinder in front of the trawl bag (3) for sorting out small and juvenile fish and species not to be caught.

FIG. 4 shows one arrangement of the outslip units (11). The unit consists of grid frames (10) that are connected to each other and to the net of the trawl by moveable hinges (9). Thereby each grid frame (10) can move more easily and follow the movement of the trawl. This is practical both when the trawl is in the water for fishing an also when the trawl is taken on-board the ship.

Figure 5:
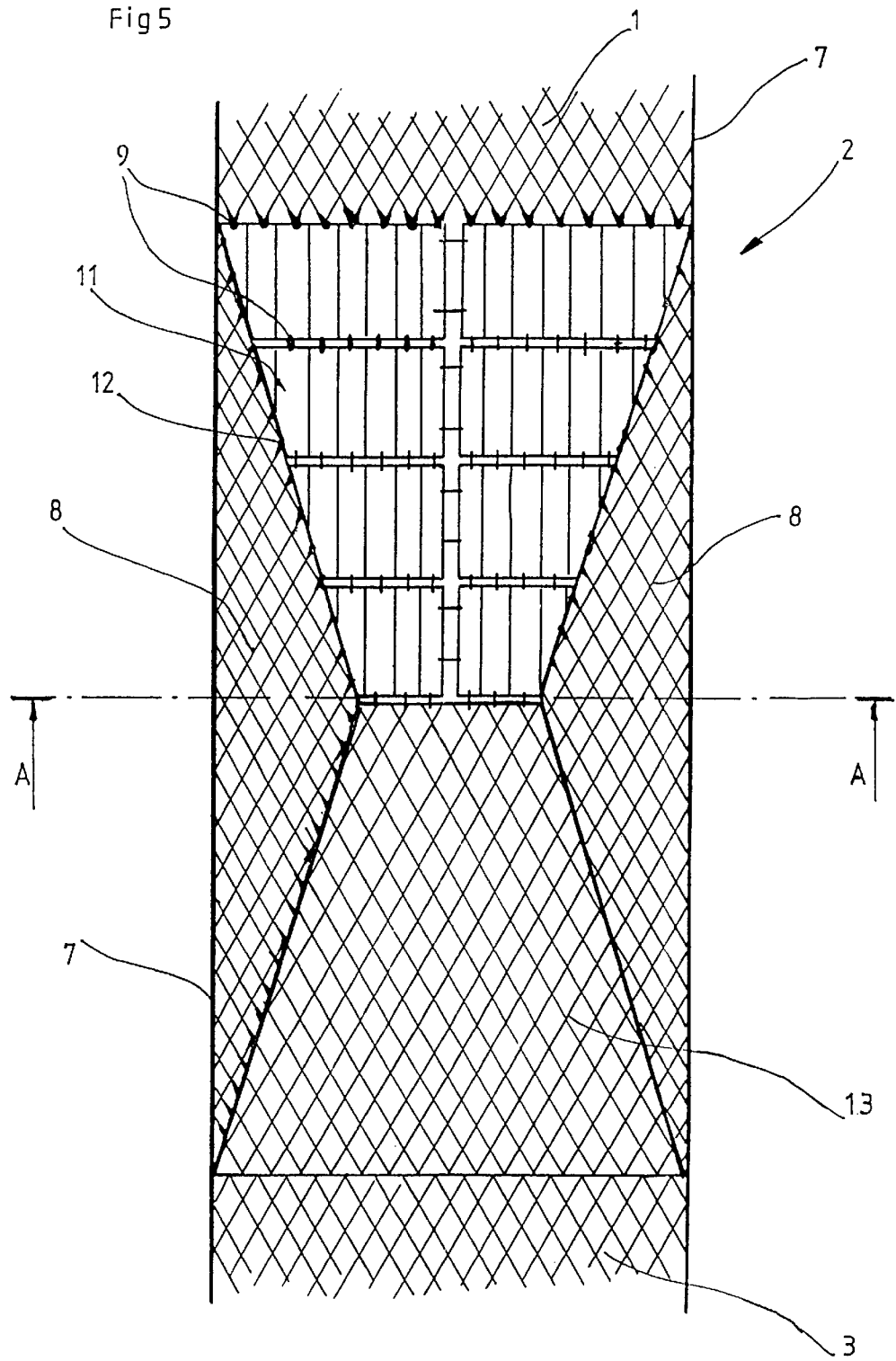
FIG. 5 shows the device from above.

FIG. 5 show the selecting device seen from above. The outslip unit (11) is shown with eight grid frames, but the number of frames can be more or less. They are all hinged with flexible fastenings f.ex. moveable hinges (9) f.ex. locks or knots. In the same way they are connected to the trawl (1) with similar fasteners (9). The figure show one arrangement of grid unit where each and every unit is trapezoid in form and as a whole they also form a trapezoid. The trapezoid form is not the only arrangement possible for the outslip unit units. To form the selecting device, net parts are removed from sides of the trawl in such a way that its cross section is narrowed down and less space is available for the fish in the trawl. The net parts removed are then added to the trawl sides to form a sort of wings (8) or strengthening to the trawl.

Figure 6:
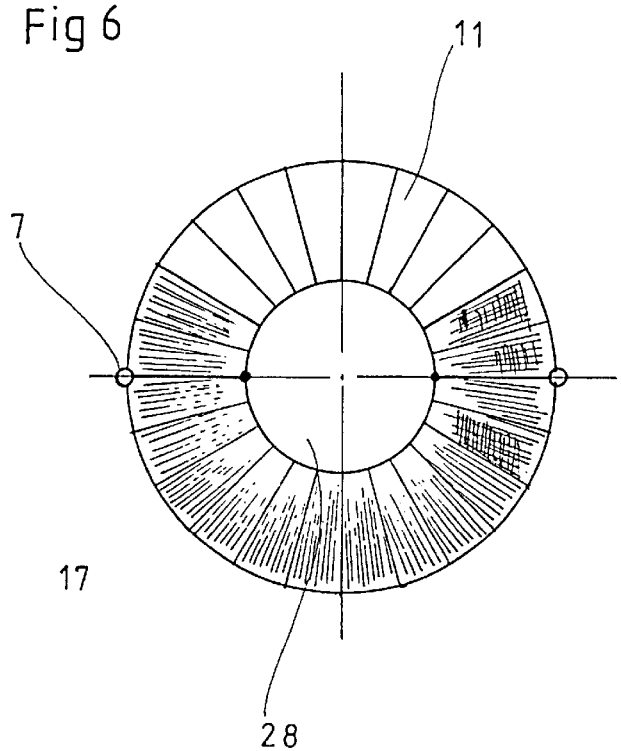
FIG. 6 shows a the view of the device seen in the direction of the main axis.

FIG. 6 shows cross section A—A from FIG. 5. The diameter of the device is narrowed into the middle (28) in such a way that the device cross section becomes smaller in diameter (28). In the upper part of the device the outslip unit (11) with the grid frames is inserted.

Figure 7:
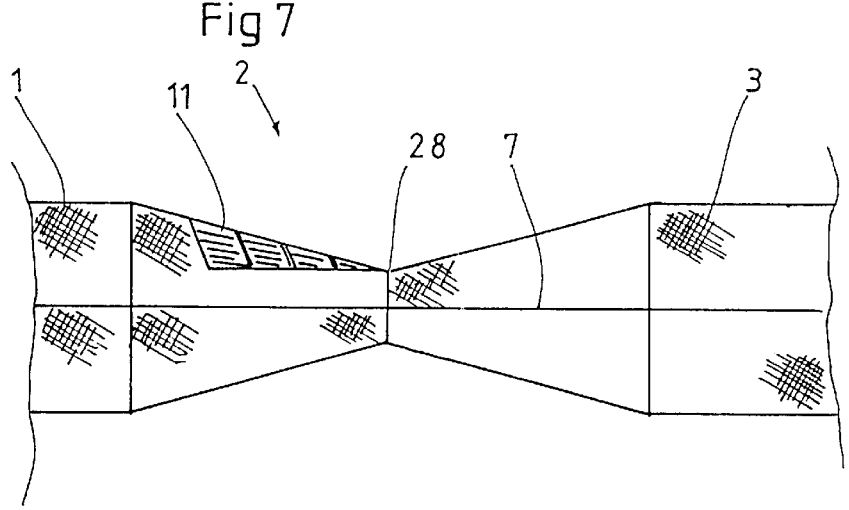
FIG. 7 shows the device seen from the side.

FIG. 7 shows a more detailed arrangement of the grid frames (10) of the out-slip unit (11). Each grid frame is a trapezoid with inserted rods (15) with predetermined distance (31). The grid frames are fastened together with moveable hinges (9). In the same way the grid frames are fastened to the net with moveable hinges (9). As the basic grid frames (10) are small and they fastened together and to the net with moveable hinges the out-slip unit (11) becomes very flexible and easy to work with. No difficulties are foreseen when taking the trawl onboard the ship or when handling it onboard the ship.

Figure 8:
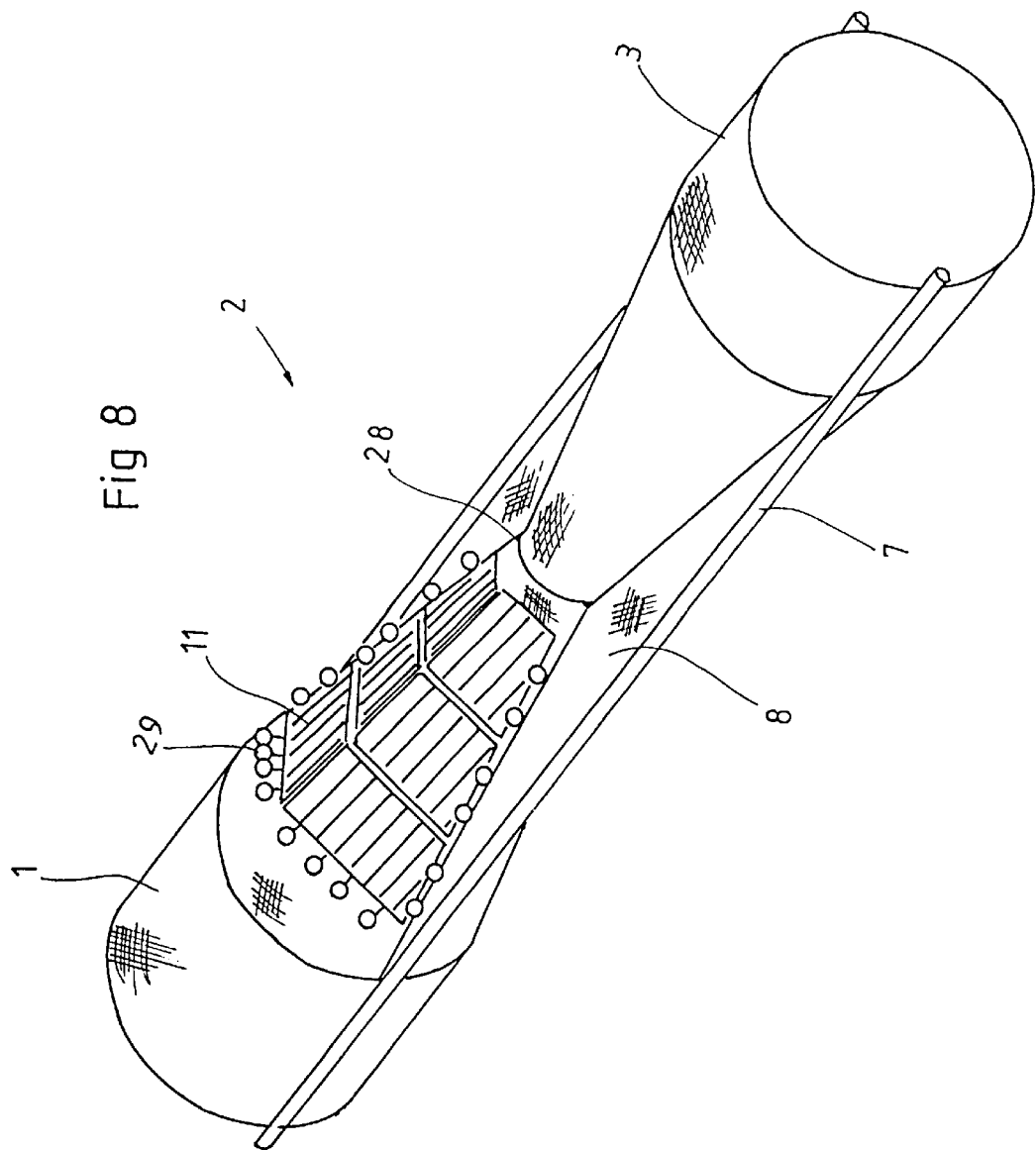
FIG. 8 shows 3-dimentional of the device.

FIG. 8 shows a 3-dimentional cross section of that part of the trawl where the selecting device (2) is inserted just in front of the trawl bag (3). In this part of the trawl the current is more even than nearer the opening of the trawl where larger quantity of sea flow out of the trawl. Research has shown that when fish comes into the cylinder of the trawl it often manages to recover and turns to swim in the direction of trawling and tries to escape. The device (2) is a venturi-type narrowing comprising an outslip unit that are f.ex. inserted in the upper half of the trawl. The outslip unit can be made of grid frames (10) f.ex. trapezoid in form. Floats (29) can be used to hold the grid frames up as they can be made of heavy material such as steel. By the venturi-type narrowing the velocity/pressure of the water in the front half of the device is increased. As the outslip unit has much grater opening than the other part of the device the outflow of water will be increased and thereby the fish will be directed towards the outslip unit (11). The mud that is formed when the trawl doors (20) are dragged over the ocean floor also encourage the fish to seek upwards. If small fish and non quota fish has maximum diameter less than the distance between the bars of the grid frames the fish can escape. At the sides of the trawl there are ropes (7) that carry most of the weight of the trawl and the catch collected in the trawl bag.

FIG. 9 shows a complete outslip unit (11) made of eight grid frames (10) that are to be connected together with moveable hinges (9).

FIG. 10 shows a diagram for the outslip of fish through the device. This is the result of trawling trial conducted by the Icelandic Marine Research Institute. The diagram clearly indicate the way the device works. The line (A) shows the number of fishes and their length caught in a special bag placed over the outslip unit. The line (B) on the other hand shows the number of fishes and their sizes that landed in the trawl bag. The diagram clearly indicate the efficacy of the device to out-sort juvenile and small fishes not to be caught.

FIG. 11 shows the current flow in the device. As the trawl is towed the water velocity/pressure in front of the venturi-type narrowing is increased. As the outslip unit (11) has opening larger than other parts of the device the water is allowed to slip there-out. The direction of the water flow is thereby changed as shown in the figure.

It is nescesery to underline that the outslip unit units in the upper surface is only one of many possible arrangements. It is easy to contemplate placing outslip unit units in different positions in the trawl both at its sides and if it was considered desirable in the bottom surface of the trawl. It is possible to use the device for all kinds of fish and marine species, round fish, flat fish and crustacean animal. It is only necessary to enlarge or diminish or even turn the rods in the grid frames.

The invention described above is not limited to precisely those details that have been specified but can be elaborated upon in many ways without deviating from the central concept herein described.

What is claimed is:

1. A marine species selecting apparatus comprising:
   a trawl having a downstream portion including a selecting device; and
   a trawl bag;
   wherein said selecting device includes a venturi passage connecting said trawl and said trawl bag, and includes an outslip unit arranged directly upstream of said venturi passage so as to form a surface portion of said trawl, said outslip unit comprising a plurality of grid frames, said grid frames being interconnected and connected to said trawl by moveable hinges.

2. The apparatus of claim 1, wherein said trawl comprises netting, said venturi passage being formed by removing portions of said netting such that said venturi passage has a cross-sectional area smaller than said trawl.

3. The apparatus of claim 2, wherein said outslip unit is arranged at an upper half of said venturi passage.

4. The apparatus of claim 2, wherein said venturi passage has openings and said outslip unit has openings, a size of said openings of said outslip unit being larger than a size of said openings of said venturi passage.

5. The apparatus of claim 2, wherein said cross-sectional area of said venturi passage is 30–70% less than a cross-sectional area of said trawl.

6. The apparatus of claim 1, wherein said outslip unit is arranged at an upper half of said venturi passage.

7. The apparatus of claim 6, wherein said venturi passage has openings and said outslip unit has openings, a size of said openings of said outslip unit being larger than a size of said openings of said venturi passage.

8. The apparatus of claim 6, wherein a cross-sectional area of said venturi passage is 30–70% less than a cross-sectional area of said trawl.

9. The apparatus of claim 1, wherein said venturi passage has openings and said outslip unit has openings, a size of said openings of said outslip unit being larger than a size of said openings of said venturi passage.

10. The apparatus of claim 9, wherein a cross-sectional area of said venturi passage is 30–70% less than a cross-sectional area of said trawl.

11. The apparatus of claim 1, wherein a cross-sectional area of said venturi passage is 30–70% less than a cross-sectional area of said trawl.

* * * * *